United States Patent
Cheon et al.

(10) Patent No.: US 10,444,276 B2
(45) Date of Patent: Oct. 15, 2019

(54) COMPUTING DEVICE EXECUTING PROGRAM PERFORMING METHOD OF ANALYZING POWER NOISE IN SEMICONDUCTOR DEVICE, SEMICONDUCTOR DEVICE DESIGN METHOD, AND PROGRAM STORAGE MEDIUM STORING PROGRAM

(71) Applicant: SAMSUNG ELECTRONICS CO., LTD., Suwon-si, Gyeonggi-Do (KR)

(72) Inventors: Young Hoe Cheon, Suwon-si (KR); Chan Seok Hwang, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 16 days.

(21) Appl. No.: 15/949,114

(22) Filed: Apr. 10, 2018

(65) Prior Publication Data
US 2018/0224497 A1   Aug. 9, 2018

Related U.S. Application Data

(62) Division of application No. 14/959,178, filed on Dec. 4, 2015, now Pat. No. 9,958,495.

(30) Foreign Application Priority Data

Dec. 5, 2014   (KR) .......................... 10-2014-0174202

(51) Int. Cl.
*G06F 17/50*   (2006.01)
*G01R 31/26*   (2014.01)
*G11C 29/50*   (2006.01)
*G11C 5/14*    (2006.01)

(52) U.S. Cl.
CPC ..... *G01R 31/2646* (2013.01); *G06F 17/5036* (2013.01); *G11C 29/50* (2013.01); *G06F 2217/78* (2013.01); *G06F 2217/82* (2013.01); *G11C 5/14* (2013.01); *G11C 2029/5002* (2013.01)

(58) Field of Classification Search
USPC ........................................................ 716/115
See application file for complete search history.

(56) References Cited

U.S. PATENT DOCUMENTS

| | | |
|---|---|---|
| 6,769,100 B2 | 7/2004 | Acar et al. |
| 7,191,113 B2 | 3/2007 | Acar et al. |
| 7,246,335 B2 | 7/2007 | Murgai et al. |
| 7,313,771 B2 | 12/2007 | Reddy et al. |
| 7,367,000 B2 | 4/2008 | Kurihara et al. |
| 8,095,343 B2 | 1/2012 | Shin et al. |
| 8,549,452 B2 | 10/2013 | Banerji et al. |
| 8,572,546 B2 | 10/2013 | Shin et al. |

(Continued)

FOREIGN PATENT DOCUMENTS

JP   5151712   12/2012

*Primary Examiner* — Bryce M Aisaka
(74) *Attorney, Agent, or Firm* — Volentine, Whitt & Francos, PLLC (57) ABSTRACT

A method of analyzing power noise in a semiconductor device includes; generating modified current information by modifying present current information based on a previous analysis result, updating a current vector based on the modified current information, and generating a present analysis result by calculating a voltage vector from the updated current vector.

20 Claims, 6 Drawing Sheets

(56) References Cited

U.S. PATENT DOCUMENTS

| | | |
|---|---|---|
| 8,635,580 B2 | 1/2014 | Wang et al. |
| 2002/0112212 A1 | 8/2002 | Cohn et al. |
| 2003/0135830 A1* | 7/2003 | Buffet ................. G06F 17/5036 716/111 |
| 2006/0031795 A1 | 2/2006 | Rahmat et al. |
| 2008/0209366 A1* | 8/2008 | Che .................... G06F 17/5036 716/136 |
| 2008/0244478 A1 | 10/2008 | Moriyama |
| 2009/0299718 A1 | 12/2009 | Amano |
| 2014/0068539 A1 | 3/2014 | Jung et al. |

* cited by examiner

| Analysis Time | $t_0$ | $t_1$ | $t_2$ | $t_3$ | ••• | $t_{(n-1)}$ | $t_n$ |
|---|---|---|---|---|---|---|---|
| CI | $CI_0$ | $CI_1$ | $CI_2$ | $CI_3$ | ••• | $CI_{(n-1)}$ | $CI_n$ |
| CI' | – | $CI'_1$ | $CI'_2$ | $CI'_3$ | ••• | $CI'_{(n-1)}$ | $CI'_n$ |
| $V(=G^{-1}U)$ | $V_0$ | $V_1$ | $V_2$ | $V_3$ | ••• | $V_{(n-1)}$ | $V_n$ |
| $V'(=G^{-1}U')$ | $V'_0$ | $V'_1$ | $V'_2$ | $V'_3$ | ••• | $V'_{(n-1)}$ | $V'_n$ |

COMPUTING DEVICE EXECUTING PROGRAM PERFORMING METHOD OF ANALYZING POWER NOISE IN SEMICONDUCTOR DEVICE, SEMICONDUCTOR DEVICE DESIGN METHOD, AND PROGRAM STORAGE MEDIUM STORING PROGRAM

CROSS-REFERENCE TO RELATED APPLICATION

This is a Divisional of U.S. application Ser. No. 14/949,178, filed Dec. 4, 2015, which claims the benefit of Korean Patent Application No. 10-2014-0174202 filed on Dec. 5, 2014, the subject matter of which is hereby incorporated by reference.

BACKGROUND

Embodiments of the inventive concept relate generally to computing devices capable of executing a program performing a method that analyzes power noise in a semiconductor device. Other embodiments of the inventive concept relate to methods of providing semiconductor device designs having more accurate power noise characterization, as well as program storage media storing program(s) performing such methods.

Contemporary semiconductor devices include a vast number of semiconductor elements that respectively and/or collectively operate in prescribed manner(s) in response to one or more applied operating voltages. Thus, the design, characterization, generation and application of various operating voltages and power voltages are important consideration in the overall design and operation of a semiconductor device. Power voltage(s) are applied to various power supply terminal(s) of a semiconductor device. These power supply voltages may then be connect to respective semiconductor elements, or groups of semiconductor elements, via a so-called power network. In like manner, various operating voltages derived from one or more power voltages may be distributed via some or all the power network. As a result, the power network constitutes a complicated power transmission path.

However, the power network (or power transmission path taken as a whole or in various portions) may be understood as having an electrical resistance. Hence, an externally provided power voltage is not directly applied to the various semiconductor elements, but is instead indirectly coupled to the semiconductor elements via a power network component having a resistance value. As a result, some non-zero drop in an applied power voltage will occur as the result of being connected to the semiconductor elements via the power network. Under certain operating conditions, it is possible that a power voltage applied to semiconductor elements may drop to the point where normal operation of the semiconductor device is not ensured. Hereafter, a dropped voltage resulting from the foregoing phenomenon will be referred to as 'power noise'. Given the narrowing margins and decreasing amplitudes of power voltages and operating voltages variously applied in contemporary semiconductor devices, it is increasingly important to accurately model or analyze power noise during the design of a semiconductor device.

SUMMARY

According to an aspect of the inventive concept, there is provided a computing device capable of executing a program performing a method of analyzing power noise in a semiconductor device which is to be modeled as a power network model and a transistor model, the method including generating a first analysis result at a first point of time by performing an arithmetic operation on first modified current information and a power network matrix, wherein the first modified current information is generated based on an assumption that the power network model exists; generating a second analysis result at a second point of time, wherein the second analysis result is second modified current information obtained by modifying second present current information, which is generated based on an ideal supply voltage condition, by using the first analysis result; and generating a power noise analysis result by performing an arithmetic operation on the second analysis result and the power network matrix.

In some embodiments, the method may further include generating the power network matrix based power network information.

In some embodiments, the second modified current information may be generated by performing an arithmetic operation on the second present current information, the first analysis result, and parameters of the transistor model.

In some embodiments, an equation for calculating the second modified current information may be derived from a rate between the second modified current information and the second present current information when the transistor model is present in a saturation region.

In some embodiments, the first analysis result and the power noise analysis result may be voltage vectors of nodes connected to the transistor model and the power network model.

In some embodiments, the previous analysis result may be a result of reflecting power noise when the power network model is connected the transistor model.

In some embodiments, the voltage vectors may be calculated using a linear analysis.

According to another aspect of the inventive concept, a method of designing a semiconductor device includes designing a power network of a semiconductor device and a plurality of cells connected to the power network; analyzing power noise in the semiconductor device by modeling the semiconductor device as a power network model and a transistor model and generating a power noise analysis result based on first modified current information and second modified current information, wherein the first modified current information is generated at a first point of time, based on an assumption that the power network model exists, and the second modified current information is obtained by modifying second present current information, which is generated at a second point of time based on an ideal supply voltage condition, by using the first analysis result; and modifying the semiconductor device based on the analyzed power noise.

In some embodiments, the analyzing of the power noise in the semiconductor device may include generating the first analysis result at a first point of time by performing an arithmetic operation on the first modified current information and a power network matrix; generating a second analysis result at a second point of time, wherein the second analysis result is the second modified current information obtained by modifying the second present current information by using the first analysis result; and generating the power noise analysis result at the second point of time by performing an arithmetic operation on the second analysis result and the power network matrix.

In some embodiments, the analyzing of the power noise in the semiconductor device may further include generating the power network matrix based on power network information.

In some embodiments, the second modified current information may be generated by performing an arithmetic operation on the second present current information, the first analysis result, and parameters of the transistor model.

In some embodiments, an equation for calculating the second modified current information may be derived from a rate between the second modified current information and the second present current information when the transistor model is present in a saturation region.

In some embodiments, the first analysis result and the power noise analysis result may be voltage vectors of nodes connected to the transistor model and the power network model.

In some embodiments, the first analysis result may be a result of reflecting power noise when the power network model is connected the transistor model.

In some embodiments, the power noise analysis result may be calculated using a linear analysis.

According to another aspect of the inventive concept, there is provided a program storage medium storing a computer program causing a computer to perform a method of analyzing power noise in a semiconductor device which is to be modeled as a power network model and a transistor model, the method including generating a first analysis result at a first point of time by performing an arithmetic operation on first modified current information and a power network matrix, wherein the first modified current information is generated based on an assumption that the power network model exists; generating a second analysis result at a second point of time, wherein the second analysis result is second modified current information obtained by modifying second present current information, which is generated based on an ideal supply voltage condition, by using the first analysis result; and generating a power noise analysis result by performing an arithmetic operation on the second analysis result and the power network matrix.

BRIEF DESCRIPTION OF THE DRAWINGS

The inventive concept may be more readily understood from a consideration of the written description that follows taken in conjunction with the accompanying drawings in which.

DETAILED DESCRIPTION

The inventive concept now will be described in some additional detail with reference to the accompanying drawings. The inventive concept may, however, be embodied in many different forms and should not be construed as being limited to only the illustrated embodiments Rather, these embodiments are provided so that this disclosure will be thorough and complete, and will fully convey the scope of the invention to those skilled in the art. Throughout the written description and drawings, like reference numbers and labels are used to denote like or similar elements, features or steps.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Power noise analysis is a method of analyzing power noise generated in a power network when a semiconductor device operates. In one particular approach to power noise analysis, a linear circuit equation is defined by converting the power network of a given semiconductor device into an equivalent RC (resistor-capacitor) circuit. Once this modeling conversion is made, the value of a current passing through an active element (e.g., a Metal-Oxide Semiconductor Field Effect Transistor—MOSFET) connected to the power network may be considered. That is, the MOSFET current may be considered as a current source and the resulting current may be calculated according to a linear analysis method, so as to analyze the power noise generated by the power network.

Here, the accuracy of a power analysis in relation to real life operating results will vary according to the accuracy and appropriateness of modeling assumptions and analysis tools. For example, in the context of the foregoing example, the accuracy of modeling the current passing through the MOSFET is quite important.

Figure 1:
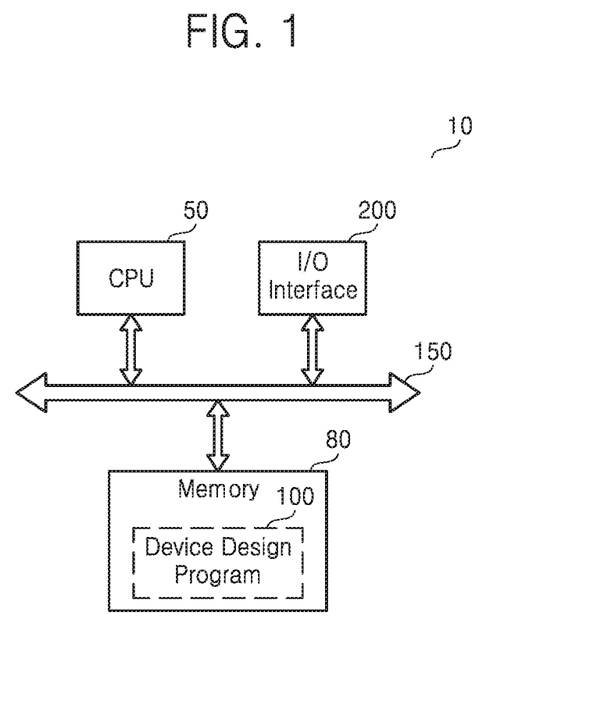
FIG. 1 is a general block diagram of a computing device capable of executing a program controlling performance of a method analyzing power noise in a semiconductor device according to embodiments of the inventive concept.
Figure 2:
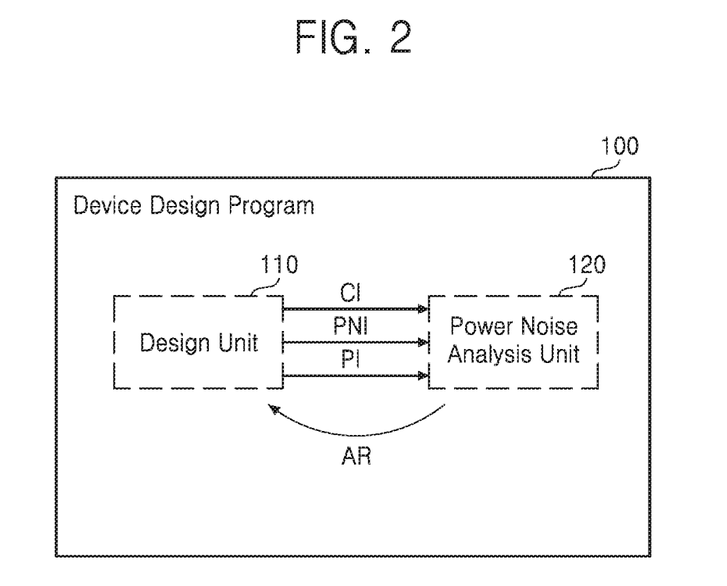
FIG. 2 is a block diagram further illustrating in one embodiments the device design program of FIG. 1.
Figure 3:
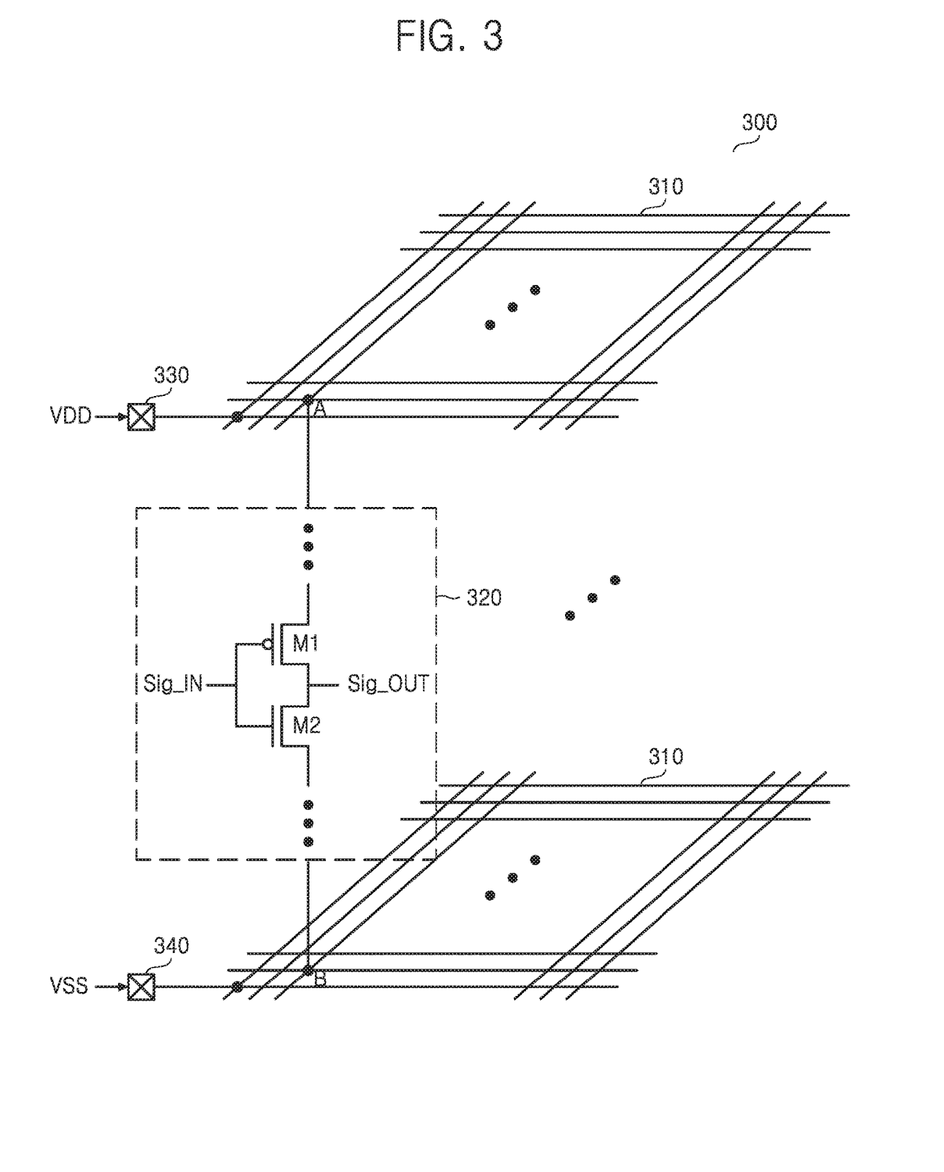
FIG. 3 is a partial schematic circuit diagram illustrating a semiconductor device capable of being accurately designed by the device design unit of FIGS. 1 and 2.
Figure 4:
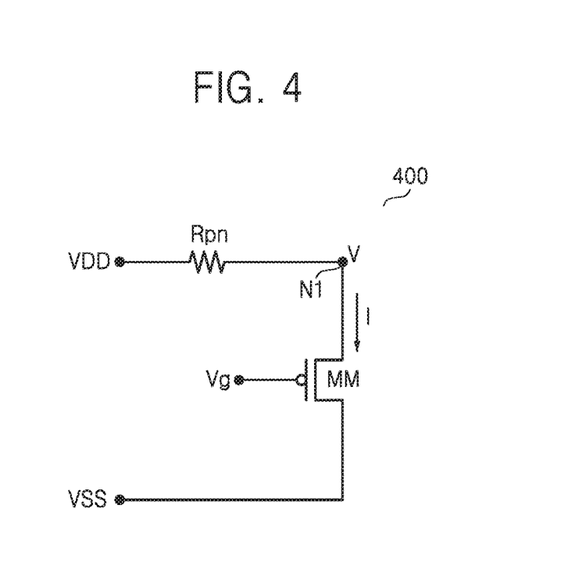
FIG. 4 is a circuit diagram illustrating a semiconductor device model capable of modeling the semiconductor device of FIG. 3.
Figure 5:
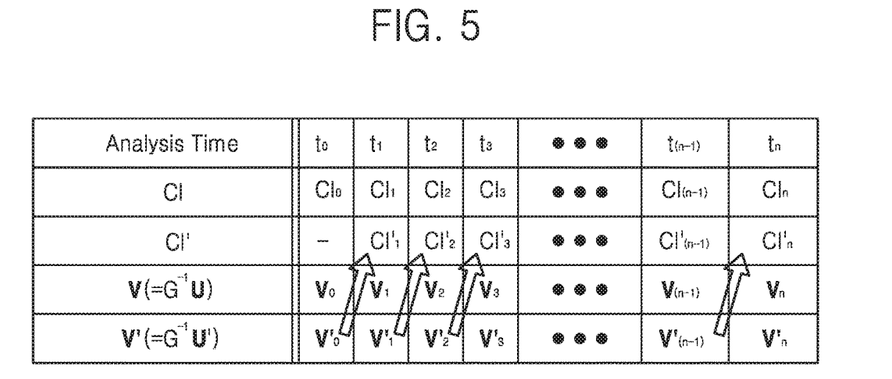
FIG. 5 is a table listing certain factors characterizing a method of operating the power noise analysis unit 120 of FIG. 2 according to embodiments of the inventive concept.

FIG. 1 is a block diagram of a computer 10 capable of performing a method of analyzing power noise in a semiconductor device according to embodiments of the inventive concept. FIG. 2 is a block diagram further illustrating the device design program 100 of FIG. 1. FIG. 3 is a partial schematic circuit diagram illustrating a semiconductor device 300 that may be designed by a design unit 110 of FIG. 2. FIG. 4 is a circuit diagram of a semiconductor device model 400 that may be modeled in accordance with the semiconductor device of FIG. 3, and FIG. 5 is a table listing certain factors relevant to a method of operating the power noise analysis unit 120 of FIG. 2 according to some embodiments of the inventive concept.

Referring to FIGS. 1, 2, 3, 4 and 5 (hereafter collectively, "FIGS. 1 to 5"), a computing device 10 may be a personal computer (PC), server, workstation, etc. The computing device 10 may generally include a central processing unit (CPU) 50, a memory 80, a bus 150, and an input/output (I/O) interface 200.

The CPU 50 may be used to control the overall operation of the computer 10, as well the execution of one or more programs, stored wholly or in part on the computing system 10 and operating on the computing device 10. The particular focus of certain embodiments described herein is a specialty program hereafter referred to as a device design program 100.

The memory 80 may be used to store program information (e.g., programming code), program data, as well as final or intermediate data output by the execution of the device design program 100. In particular, the memory 80 may be used to store some or all of the device design program 100.

In the illustrated examples of FIGS. 2 and 3, the device design program 100 may understood as software capable of being executed by the CPU 50. In the more particular embodiment shown in FIG. 2, the device design program is assumed to include a design unit 110 and a power noise analysis unit 120.

The design unit 110 may be used design one or more aspects of the semiconductor device 300 illustrated in part by FIG. 3. The semiconductor device 300 may be a device manufactured in the form of a semiconductor chip (e.g., a semiconductor memory device, an application processor, an image sensor, etc.).

As illustrated in FIG. 3, the semiconductor device 300 includes a power network 310, a plurality of cells 320, a first power supply terminal (VDD) 330, and a second power supply terminal (VSS or ground) 340. Here, the power network 310 may be assumed to apply a first power voltage (VDD—e.g., 3.0V) from the first power supply terminal 330, and a second power voltage (VSS—e.g., 0.0V) from the ground terminal 340 to the plurality of cells 320. Ideally, the power network 310 would stably provide exactly the same first power voltage VDD and second power voltage VSS to the plurality of cells 320. However, since one or more conductive line(s) must be used to connect nodes A and B, including the plurality of cells 320 between the first power supply terminal 330 and second power supply terminal 340, the actual voltages (and resulting voltage difference) applied to the plurality of cells 320 may drop to less than the power voltage VDD due to a resistance component of the various conductive lines and proximate elements. From the foregoing description, this outcome will be recognized as 'power noise'.

In this context, power noise may be analyzed using the power noise analysis unit 120.

Each of the plurality of cells 320 may operate as a functional block of the semiconductor device 300, e.g., a sense amplifier of a semiconductor memory device, independently or in combination with at least one among the other cells 320. Only one of the many cells 320 is illustrated in FIG. 3, where the cell 320 includes the combination of a PMOS transistor M1 and an NMOS transistor M2 arranged to form an inverter receiving an input signal Sig_IN and output an output signal Sig_OUT. The cell 320 of FIG. 3 is, however, merely an example, and each of the plurality of cells 320 may be a circuit that may operate when a first power voltage (e.g., VDD) and a different second power voltage (e.g., VSS) are applied thereto.

Although only one of the plurality of cells 320 is illustrated for convenience of explanation, the semiconductor device 300 may include several hundreds of thousands of cells 320 or more. Each of these cells 320 may be connected to a point (e.g., an intersection point of two or more lines or along a midpoint on a particular line) on the power network 310.

With the semiconductor device 300 in mind, the design unit 110 of FIG. 2 may be used to generate a circuit structure at the transistor level, for example, and model all or part of the semiconductor device 300 as a simple circuit for various analyses, including for a power noise analysis. For example, FIG. 4 shows one possible simple circuit model 400 for the semiconductor device 300 of FIG. 3.

In FIG. 4, the semiconductor device model 400 includes a power network model Rpn and a transistor model MM. The power network model Rpn is an equivalent resistor modeled after a resistance component of the power network 310. In certain embodiments of the inventive concept, the power network model Rpn may be expressed as a combination of a resistor and a capacitor. However, for convenience of explanation, it is assumed in the present disclosure that the power network model Rpn is expressed as a single resistor. That is, the power network model Rpn may be expressed as a resistor connected between a first power voltage (e.g., VDD) source and a first node N1. Hence, the power network model Rpn may be an equivalent resistor modeling a (line) resistance component between the nodes A and B connecting the cell 320 in FIG. 3, where the first power supply terminal 330 applying the first power voltage (VDD) is proximate node A and the second power supply terminal 340 applying the second power voltage (VSS) is proximate node B.

A resistance value of the power network model Rpn may vary according to the location of the cell 320 within a matrix of cells and/or according to position along one or more lines.

The transistor model MM is an equivalent transistor modeled after each of the plurality of cells 320. In some embodiments, the transistor model MM may be expressed as a NMOS transistor or a combination of a PMOS transistor and an NMOS transistor. However, for convenience of explanation, it is assumed in the working example of FIGS. 1 to 5 that the transistor model MM is expressed as a single PMOS transistor. That is, the transistor model MM may be expressed as a PMOS transistor connected between the first node N1 and a second power voltage (VSS) source in FIG. 4.

For example, the transistor model MM may be one equivalent transistor modeled after a complicated circuit that includes the transistors M1 and M2 of the cell 320 of FIG. 3.

A gate voltage Vg may be applied to a gate of the transistor model MM and drain current I will flow between a source and a drain of the transistor model MM. A source voltage Vs of the transistor model MM, i.e., a voltage of the first node N1, may be defined as a dropped voltage V.

The transistor model MM may have transistor parameters (e.g., a capacitance Cox per unit area of a channel, a ratio W/L between the width and the length of the channel, a low-field mobility $\mu_0$, $\theta(10-7/\text{Tox})$, a threshold voltage Vth, etc., where the variable 'Tox' denotes the thickness of a gate oxide.

Accordingly, the design unit 110 of FIG. 2 may model the power network model Rpn and the transistor model MM that are variable for the plurality of cells 320 of FIG. 3. Here, the design unit 110 may provide the power noise analysis unit 120 with parameter information PI regarding the parameters of the transistor model MM, power network information PNI regarding the resistance value of the power network model Rpn, and present current information CI regarding drain current I. The information PI, PNI, and CI may include information corresponding to each of the plurality of cells 320.

In this context, the drain current I of the present current information CI is drain current I in a state in which it is assumed that the power network model Rpn does not exist in the semiconductor device model 400 of FIG. 4 (i.e., an ideal supply voltage condition). This is because a very large number of calculations is required for the power network model Rpn, and thus the design unit 110 may generate only the present current information CI regarding the drain current I corresponding to a case in which the power network model Rpn does not exist.

The power noise analysis unit 120 may generate an analysis result AR obtained by analyzing power noise in the semiconductor device 300 based on the present current information CI, the power network information PNI, and the parameter information PI.

One exemplary approach to power noise analysis makes the following assumptions. First, it is assumed that the drain current I of the transistor model MM is current when the transistor model MM is present in a saturation region. This is because the transistor model MM is present in a triode region for a very short time and the saturation region is a significant region in terms of power consumption.

Second, it is assumed that the gate voltage Vg of the transistor model MM is the ground voltage VSS and the transistor model MM is in a ON state. Also, it is assumed that the source voltage Vs of transistor model MM is the power voltage VDD.

Third, it is assumed that the threshold voltage Vth of the transistor model MM is maintained constant.

Based on the foregoing assumptions, the power noise analysis unit 120 may calculate a voltage of the first node N1 with respect to power noise. Power noise in the semiconductor device 300 may change according to various operations of the semiconductor device 300 (e.g., a read operation, a write operation, etc.), and may even change with time during a single operation. Thus, the power noise analysis unit 120 may analyze power noise across a number of points in time (e.g., points $t_0$ to $t_n$ in FIG. 5). In particular, examples of information that may change over a given time period include the present current information CI.

Since the information PI, PNI, and CI correspond to each of the plurality of cells 320, a set of drain currents I may be expressed as a current vector I and a set of dropped voltages V may be expressed as a voltage vector V.

A method of analyzing power noise by the power noise analysis unit 120 based on an assumption that the source voltage Vs of the transistor model MM is equal to the power voltage VDD may be a type of a custom design method.

The power noise analysis unit 120 may generate a node equation with respect to the first node N1, and the voltage vector V may be expressed by Equation 1 below, $$V = G^{-1} \cdot U \qquad \text{Equation 1}$$

wherein a power network matrix 'G' is a result of expressing in the form of a matrix the resistance value of the power network model Rpn included in the power network information PNI, and 'U' denotes a vector that changes according to current vector I, and that is a combination of the current vector I and a constant (e.g., the power voltage VDD or the resistance value Rpn). The voltage vector 'V' may be calculated using a linear analysis method.

Here consistent with the foregoing definition, power noise may be understood as a voltage drop with respect to a power voltage (e.g., first power voltage VDD) due to the power network 310 with respect to each of the plurality of cells 320. In the working example, power noise is equal to the difference between the first power voltage VDD and the voltage vector V determined by Equation 1.

The power noise analysis unit 120 may generate the power network matrix G from the power network information PNI so as to analyze power noise. Also, the power noise analysis unit 120 may generate or update the current vector I based on the present current information CI.

At a first time $t_0$ of FIG. 5, the power noise analysis unit 120 may receive present current information $CI_0$ and generate a current vector I based on the present current information $CI_0$. Basically, the power noise analysis unit 120 should generate the current vector I by using modified current information $CI'_0$ obtained by modifying the present current information $CI_0$ based on a previous analysis result (i.e., a voltage vector V' modified at a point of time right before the point of time $t_0$). However, the previous analysis result does not actually exist at the point of time $t_0$ and thus the current vector V is generated based on present current information $CI_0$.

The power noise analysis unit 120 may calculate a modified voltage vector $V'_0$ from the power network matrix G and the current vector I that are generated beforehand. Here, the modified voltage vector $V'_0$ denotes a voltage vector calculated from a current vector I generated or updated based on the modified current information $CI'_0$, and the voltage vector $V_0$ denotes a voltage vector calculated from a current vector I generated or updated based on the present current information $CI_0$. However, at time $t_0$, the present current information $CI_0$ and the modified current information $CI'_0$ are the same and thus the modified voltage vector $V'_0$ and the voltage vector $V_0$ are the same.

At time $t_1$, the power noise analysis unit 120 may receive new present current information $CI_1$, and generate modified current information $CI'_1$ by modifying the present current information $CI_1$ based on a previous analysis result.

It is assumed that one of drain currents included in the present current information $CI_1$ is drain current $I_D$.

The drain current $I_D$ may be expressed by Equation 2 below, $$I_D = \frac{1}{2} \cdot \mu_{eff} \cdot C_{OX} \cdot \frac{W}{L}(V_{gs} - V_{th})^2 \qquad \text{Equation 2}$$

wherein '$\mu_{eff}$' denotes effective surface mobility, '$V_{gs}$' denotes a voltage between the gate and the source of the transistor model MM, and '$C_{ox}$', 'W/L', and '$V_{th}$' have been described above.

The effective surface mobility $\mu_{eff}$ is a value obtained when the low-field mobility $\mu_0$ decreases due to a vertical-field effect. The relationship between the effective surface mobility $\mu_{eff}$ and the low-field mobility $\mu_0$ may be expressed by Equation 3 below, $$\mu_{eff} = \frac{\mu_o}{1 + \theta \cdot (V_{gs} - V_{th})} \qquad \text{Equation 3}$$

wherein "$\theta$" is an offset.

The drain current $I_D$ is based on the present current information $CI_1$ and is thus a drain current generated when a gate voltage and a source voltage of the transistor model MM is equal to the ground voltage VSS and the power voltage VDD, respectively.

The power noise analysis unit 120 may calculate modified drain current $I'_D$ which is drain current when the previous analysis result (i.e., a dropped voltage V corresponding to the transistor model MM among modified voltage vectors V' generated at the point of time $t_0$) is used as the source voltage of the transistor model MM.

That is, the power noise analysis unit 120 may calculate the modified drain current $I'_D$ by using Equation 4 below which is derived from Equations 2 and 3, $$I' = I \cdot \frac{1 + \theta \cdot (V_g - V_s - V_{th})}{1 + \theta \cdot (V_g - V'_s - V_{th})} \left( \frac{V_g - V_s - V_{th}}{V_g - V'_s - V_{th}} \right)^2 \qquad \text{Equation 4}$$

wherein '$V_g$' denotes the ground voltage VSS, '$V_s$' denotes the power voltage VDD, and '$V'_s$' denotes the previous analysis result.

That is, the previous analysis result V's means a voltage of the first node N1 or the source voltage of the transistor model MM when the power network model Rpn exists. Thus, the modified drain current $I'_D$ reflecting the previous analysis result is more similar to an actual model than the drain current $I'_D$ obtained based on an assumption that the power network model Rpn does not exist (i.e., where Vs=VDD).

Equation 4 may be derived from the ratio between the drain current $I_D$ and the modified drain current $I'_D$ when the transistor model MM operates in a saturation region.

The power noise analysis unit 120 may generate modified current information $CI'_1$ that includes modified drain current $I'_D$ corresponding to each of the plurality of cells 320. The power noise analysis unit 120 may update current vector I based on the modified current information $CI'_1$.

Also, the power noise analysis unit 120 may calculate a modified voltage vector $V'_1$, based on the power network matrix G and the updated current vector I and according to Equation 1.

Each of components of the modified voltage vector $V'_1$ may be less than each of components corresponding to the voltage vector $V_1$ calculated from the current vector I updated based on the present current information $CI_0$. This is because the modified current information $CI'_1$ is not based on an assumption that the source voltage of the transistor model MM is equal to the power voltage VDD, and is calculated from the modified voltage vector $V'_0$ when the power network model Rpn exists at the previous point of time $t_0$.

Similarly, modified voltage vectors $V'_2$ to $V'_n$ generated at the subsequent points of time $t_2$ to $t_n$, respectively, are generated from modified voltage vectors $V'_1$ to $V'_{n-1}$ generated at points of time right before the points of time $t_2$ to $t_n$, i.e., a previous analysis result, based on modified current information $CI'_2$ to $CI'_n$ obtained by modifying present current information $CI_2$ to $CI_n$. Here, 'n' denotes an integer that is equal to or greater than '1' and may be a value set beforehand in the device design program 100.

When the generation of the modified voltage vectors $V'_0$ to $V'_n$ is completed, the power noise analysis unit 120 may provide the modified voltage vectors $V'_0$ to $V'_n$ as an analysis result AR to the design unit 110.

The design unit 110 may modify the semiconductor device 300 based on the analysis result AR, i.e., analyzed power noise. For example, if a minimum driving voltage for operating the cells 320 normally is 2.0V, the design unit 110 may not modify the semiconductor device 3000 in relation to the cells 320 when a minimum value of a dropped voltage V included in the analysis result AR at the point of time $t_0$ to $t_n$ is 2V or more. However, when the minimum value of the dropped voltage V is less than 2.0V, the design unit 110 may modify the structures of the power network 310 and/or the cells 320 of the semiconductor device 300 in relation to the cell 320 so as to secure a minimum driving voltage.

Referring back to FIG. 1, the memory 80 may be a non-volatile memory or a volatile memory. The non-volatile memory may be a memory capable of retaining data therein regardless of whether power is supplied to the memory 80 (e.g., a programmable read-only memory (PROM), an erasable PROM (EPROM), an electrically EPROM (EEPROM), a flash memory, a phase-change random access memory (PRAM), etc.). The volatile memory may be a memory capable of retaining data therein only when power is supplied to the memory 80 (e.g., a dynamic RAM (DRAM) or a static RAM (SRAM), etc.).

Data may be communicated among the CPU 50, memory 80, and I/O interface 200 via the bus 150 using conventionally understood approaches.

The I/O interface 200 may be used to convert input data received from external circuits (e.g., an externally disposed storage medium, a display, a user input, etc.) as well as output data to be provided to external circuits by the computing device 10.

At this point it should be noted that a device design program according to some embodiments of the inventive concept will not operate under an assumption that the power network model Rpn does not exist, and/or under an assumption that a present analysis is generated to reflect a previous analysis result which is power noise when the power network model Rpn is connected to the transistor model MM, thereby even more accurately analyzing the power noise.

Figure 6:
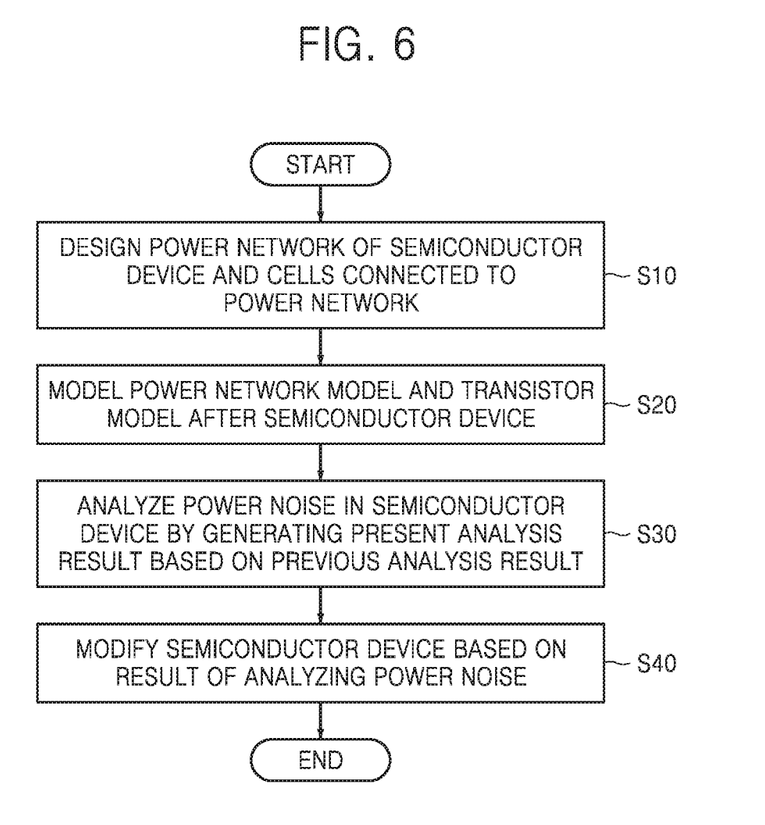
FIG. 6 is a flowchart summarizing in one embodiment a method of designing the semiconductor device of FIG. 3 according to certain embodiments of the inventive concept.
Figure 7:
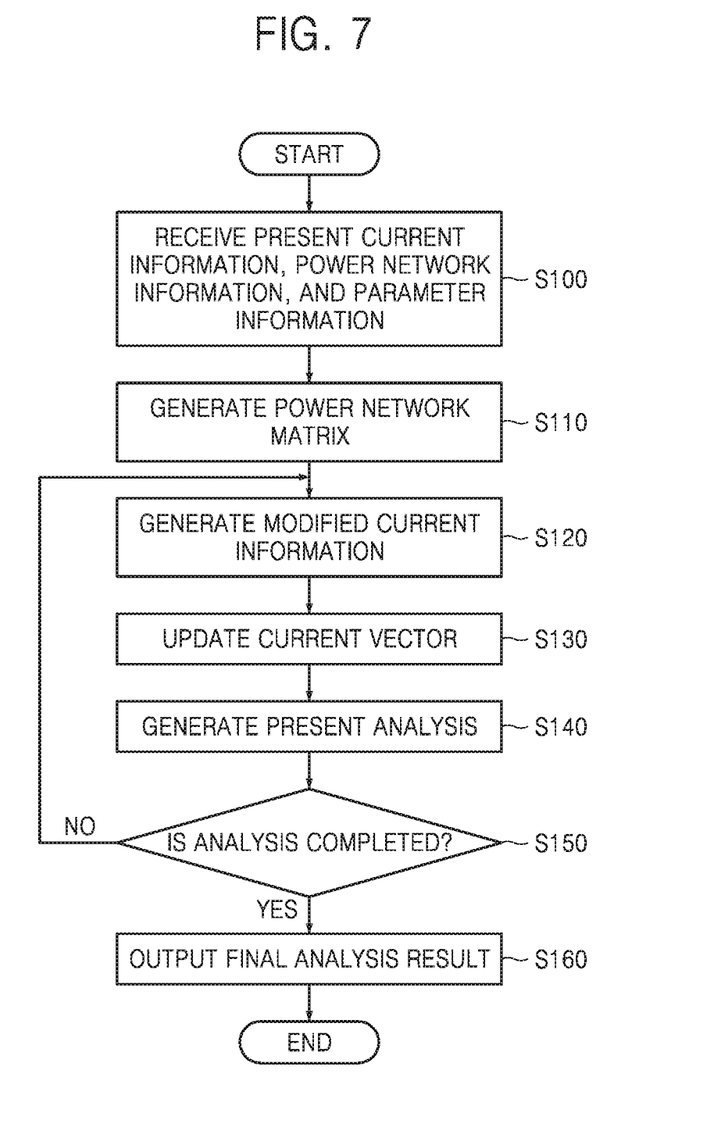
FIG. 7 is a flowchart summarizing one possible approach to the method step of analyzing the power noise S30 of FIG. 6 according to embodiments of the inventive concept.

FIG. 6 is a flowchart summarizing a method of designing the semiconductor device 300 of FIG. 3 according to some embodiments of the inventive concept. FIG. 7 is a flowchart further detailing the step of analyzing power noise (S30) of FIG. 6 according to some embodiments of the inventive concept.

Referring to FIGS. 1 to 7, the design unit 110 may be used to design (or model) the power network 310 of the semiconductor device 300, as well as the plurality of cells 320 connected to the power network 310 (S10).

The design unit 110 may model the power network model Rpn and the transistor model MM after the semiconductor device 300 (S20).

The power noise analysis unit 120 analyzes power noise in the semiconductor device 300 by generating a present analysis result based on a previous analysis result (S30). In certain embodiments of the inventive concept, the operation S30 of the method summarized in FIG. 6 may include operations S100 to S160 of FIG. 7.

Thus, with reference to FIG. 7, the power noise analysis unit 120 may receive the parameter information PI, power network information PNI, and present current information CI from the design unit 110 (S100).

The power noise analysis unit 120 may generate a power network matrix G which is a result of expressing in the form of a matrix a resistance value of the power network model Rpn included in the power network information PNI (S110).

The power noise analysis unit 120 may generate modified current information CI' by modifying present current information CI based on the previous analysis result (a modified voltage vector V' at a previous point of time) (S120). The modified current information CI' is generated by performing an arithmetic operation on the present current information CI, a source voltage Vs' of the transistor model MM according to the previous analysis result (the modified voltage vector V') and the parameters θ and Vth of the transistor model MM, as shown in Equation 4.

The power noise analysis unit 120 may update the current vector I using the modified current information CI' (S130).

The power noise analysis unit 120 may calculate a present analysis result which is a modified voltage vector V', based on the power network matrix G and the updated current vector I and according to Equation 1 (S140).

Operations S120 to S140 are repeatedly performed from a point of time $t_0$ to a point of time $t_n$ (S150).

When generation of modified voltage vectors $V'_0$ to $V'_n$ is completed, the power noise analysis unit 120 may output the modified voltage vectors $V'_0$ to $V'_n$ as an analysis result AR to the design unit 110 (S160).

Returning to FIG. 6, the design unit 110 may modify the semiconductor device 300 based on the analysis result AR, i.e., analyzed power noise (S40).

In certain embodiments, the inventive concept may be embodied, at least in part, as computer-readable code capable of being stored on at least one computer-readable medium, and further capable of being executed by computational and control logic to execute one or more methods, like the ones described above. The computer-readable recording medium may be any data storage device capable of storing program data and being read by the computing device 10 of FIG. 1. Examples of the computer-readable recording medium include read-only memory (ROM), random-access memory (RAM), CD-ROMs, magnetic tapes, floppy disks, and optical data storage devices.

Those skilled in the art are deemed capable of writing, editing and functionally arranging programs, code(s), and code segments to variously implement embodiments of the inventive concept.

In a method of designing a semiconductor device according to embodiments of the inventive concept, it need not be assumed that the power network model Rpn does not exist, and/or that a present analysis result is generated to reflect a previous analysis result representing power noise when the power network model Rpn is connected to the transistor model MM, thereby more actually analyzing power noise.

In a computing device capable of executing a program performing a method of analyzing power noise in a semiconductor device, a semiconductor device designing method including the method, and a program storage medium storing the program according to some embodiments of the inventive concept, it is not assumed that a power network model does not exist, and a present analysis result is generated to reflect a previous analysis result representing power noise when a power network model is connected to a transistor model, thereby more actually analyzing power noise.

While the inventive concept has been particularly shown and described with reference to exemplary embodiments thereof, it will be understood that various changes in form and details may be made therein without departing from the scope of the following claims.

What is claimed is:

1. A method of generating a semiconductor device design in a computing device, the method comprising:
designing a power network for a semiconductor device and a plurality of cells connected to the power network to obtain a generated semiconductor device design;
analyzing power noise of the power network based on modeling the semiconductor device as a power network model and a transistor model,
generating a generated semiconductor device design as a result of analyzing the power noise of the power network based on first modified current information and second modified current information, wherein the first modified current information is generated at a first time as a result of a first analysis based on an assumption that the power network model exists, and the second modified current information is generated at a second time after the first time by modifying present current information based on an ideal supply voltage condition using the result of the first analysis; and
storing at least part of the generated semiconductor device design in a memory associated with the computing device.

2. The method of claim 1, further comprising:
providing the semiconductor device design based on the designing of the power network for the semiconductor device and the plurality of cells connected to the power network; and
modifying the semiconductor device design based on the analyzing of the power noise of the power network.

3. The method of claim 1, wherein the analyzing of the power noise comprises:
generating the result of the first analysis at the first time by performing an arithmetic operation on a power network matrix;
generating a result of a second analysis at the second time, wherein the result of the second analysis is the second modified current information generated by modifying the present current information based on the ideal supply voltage condition using the result of the first analysis; and
generating the result of the analyzing the power noise of the power network by performing an arithmetic operation on the result of the second analysis and the power network matrix.

4. The method of claim 3, wherein the analyzing of the power noise comprises generating the power network matrix based on power network information.

5. The method of claim 3, wherein the second modified current information is generated by performing an arithmetic operation on the present current information, the result of the first analysis, and parameters of the transistor model.

6. The method of claim 5, wherein an equation calculating the second modified current information is derived from a rate between the second modified current information and the present current information when the transistor model is in a saturation region.

7. The method of claim 5, wherein the result of the first analysis and the result of the analyzing the power noise are voltage vectors of nodes connected to the transistor model and the power network model.

8. The method of claim 5, the result of the first analysis is a result of reflecting power noise when the power network model is connected to the transistor model.

9. The method of claim 3, wherein the result of the analyzing the power noise is calculated using a linear analysis.

10. The method of claim 1,
wherein the computing device comprises a memory that stores a program for generating a semiconductor device design, and a processor that executes the program to perform the method of claim 1.

11. A method of generating a semiconductor device design in a computing device, the method comprising:
designing a power network for a semiconductor device and a plurality of cells connected to the power network to obtain a generated semiconductor device design;
analyzing power noise of the power network based on modeling the semiconductor device as a power network model and a transistor model;
generating a generated semiconductor device design as a result of analyzing power noise of the power network to generate a result of analyzing the power noise of the power network based on modeling the semiconductor device as a power network model and a transistor model and based on first modified current information and second modified current information, wherein the first modified current information is generated at a first time as a result of a first analysis by modifying first present current information based on an ideal supply voltage condition using the result of a previous analysis of the power noise of the power network, and the second modified current information is generated at a second time after the first time as a result of a second analysis by modifying second present current information based on an ideal supply voltage condition using the result of the first analysis; and
storing at least part of the generated semiconductor device design in a memory associated with the computing device.

12. The method of claim 11, further comprising:
providing the semiconductor device design based on the designing of the power network for the semiconductor device and the plurality of cells connected to the power network; and
modifying the semiconductor device design based on the analyzing of the power noise of the power network.

13. The method of claim 12, wherein the analyzing of the power noise further comprises:
generating the result of the first analysis at the first time by performing an arithmetic operation on the first present current information and a power network matrix;
generating the result of a second analysis at the second time; and
generating the result of the analyzing the power noise of the power network by performing an arithmetic operation on the result of the second analysis and the power network matrix.

14. The method of claim 13, wherein the analyzing of the power noise comprises generating the power network matrix based on power network information.

15. The method of claim 13, wherein the second modified current information is generated by performing an arithmetic operation on the second present current information, the result of the first analysis, and parameters of the transistor model.

16. The method of claim 15, wherein an equation calculating the second modified current information is derived from a rate between the second modified current information and the second present current information when the transistor model is in a saturation region.

17. The method of claim 15, wherein the result of the first analysis and the result of the analyzing the power noise are voltage vectors of nodes connected to the transistor model and the power network model.

18. The method of claim 15, the result of the first analysis is a result of reflecting power noise when the power network model is connected to the transistor model.

19. The method of claim 13, wherein the result of the analyzing the power noise is calculated using a linear analysis.

20. A method of generating a semiconductor device design in a computing device, the method comprising:
designing a power network for a semiconductor device and a plurality of cells connected to the power network to obtain a generated semiconductor device design;
analyzing power noise of the power network based on modeling the semiconductor device as a power network model and a transistor model;
generating a generated semiconductor device design as a result of analyzing power noise of the power network to generate a result of analyzing the power noise of the power network based on modeling the semiconductor device as a power network model and a transistor model and based on first modified current information, second modified current information and third modified current information, wherein the first modified current information is generated at a first time as a result of a first analysis by modifying first present current information based on an assumption that the power network model exists, the second modified current information is generated at a second time after the first time as a result of a second analysis by modifying second present current information based on an ideal supply voltage condition using the result of the first analysis of the power noise of the power network, and the third modified current information is generated at a third time after the second time as a result of a third analysis by modifying third present current information based on an ideal supply voltage condition using the result of the second analysis; and
storing at least part of the generated semiconductor device design in a memory associated with the computing device.

* * * * *